United States Patent [19]
Isoo et al.

[11] 3,967,242
[45] June 29, 1976

[54] AUTOMATIC WORKING MACHINE

[75] Inventors: Osamu Isoo; Shinji Matsuoka; Shigeru Matsuoka, all of Hitachi; Takeshi Uno, Sayama; Sadahiro Ikeda, Tokyo; Ikuro Masuda; Koji Kurokawa, both of Hitachi; all of Japan

[73] Assignee: Hitachi, Ltd., Japan

[22] Filed: June 13, 1974

[21] Appl. No.: 479,080

[30] Foreign Application Priority Data
June 15, 1973 Japan.............................. 48-66918

[52] U.S. Cl....................... 340/146.3 H; 72/DIG. 4; 235/151.11
[51] Int. Cl.²........................................... G06K 9/00
[58] Field of Search........... 340/146.3 AH, 146.3 H, 340/172.5; 444/1; 235/151.11, 151.1; 72/10, 12, 14, 15, DIG. 4; 90/24.3, 24.4; 408/8, 12, 13; 356/157, 158

[56] References Cited
UNITED STATES PATENTS

| | | |
|---|---|---|
| 3,356,994 | 12/1967 | Elbling............................ 340/172.5 |
| 3,549,890 | 12/1970 | Keller........................... 340/146.3 R |
| 3,603,728 | 9/1971 | Arimura....................... 340/146.3 H |
| 3,643,215 | 2/1972 | Ingham et al............. 340/146.3 AH |
| 3,744,032 | 7/1973 | Engelberger et al............ 340/172.5 |
| 3,793,625 | 2/1974 | Pomella et al.................. 340/172.5 |
| 3,852,573 | 12/1974 | Dolch........................ 340/146.3 H |

Primary Examiner—Leo H. Boudreau
Attorney, Agent, or Firm—Craig & Antonelli

[57] ABSTRACT

An automatic working machine adapted to carry out works such as cutting, filling, tightening and loosening, which comprises a visual unit for detecting, by means of the image information, a plurality of works and obstacles existing on an object, a working unit which works against a particular work and moves in relation to the object, and a tactile sensor provided in the vicinity of the working unit, the working unit being precisely positioned by the aid of the tactile sensor when the visual unit detects the particular work, the relative position being maintained during the operation, and the working unit along with the tactile sensor being retracted when the visual unit detects an obstacle, to avoid collision thereof with the obstacle.

5 Claims, 36 Drawing Figures

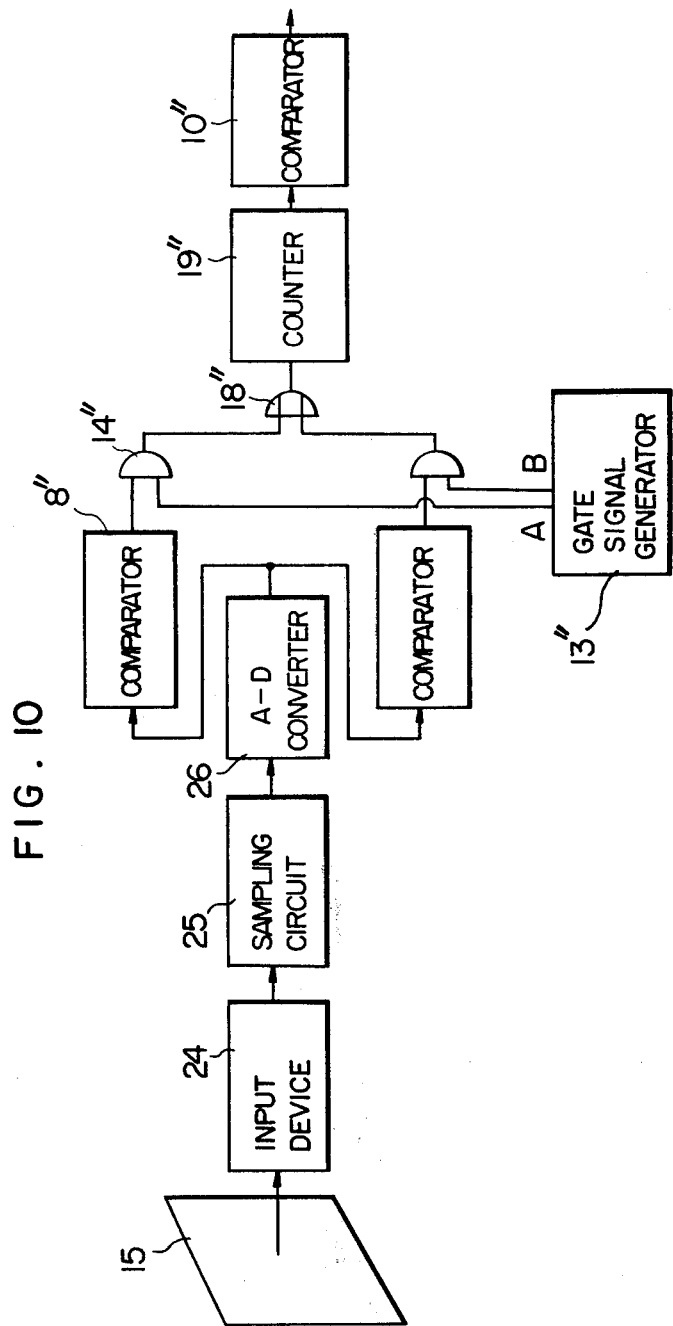

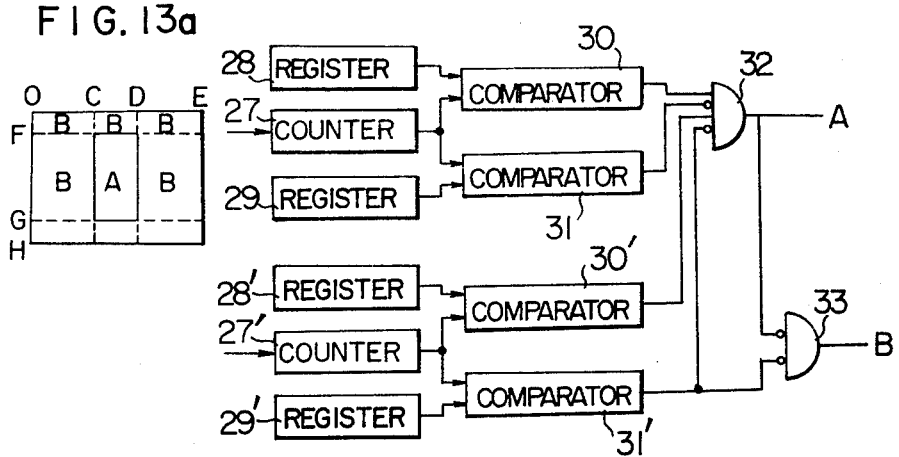
FIG. 13a
FIG. 13b
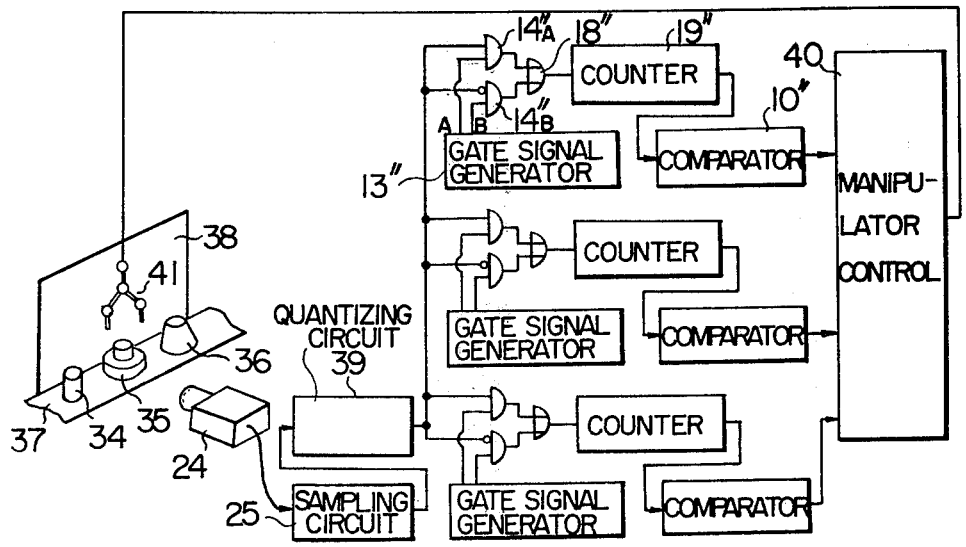
FIG. 18

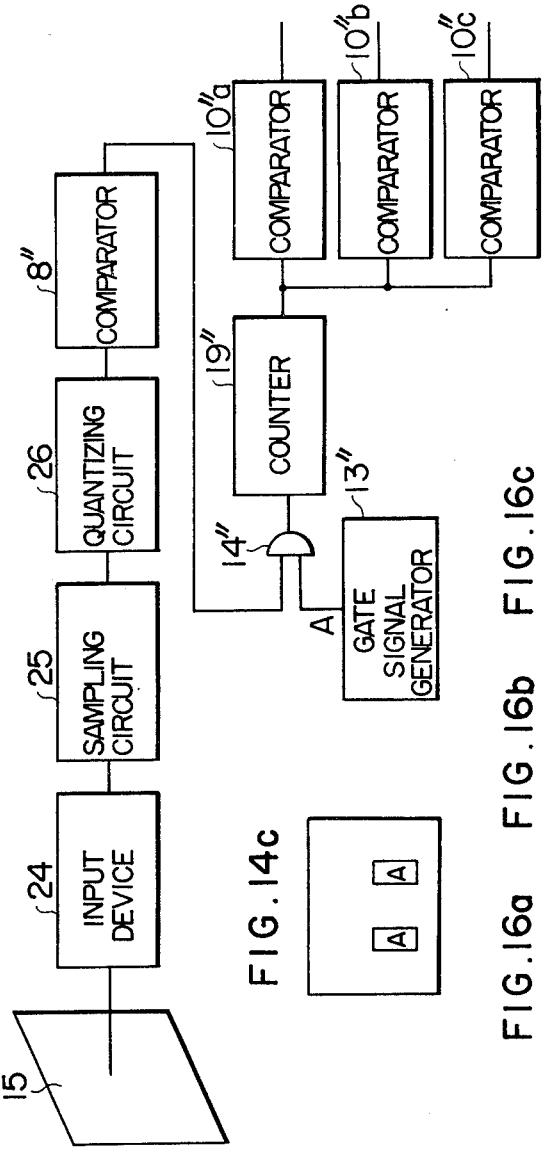

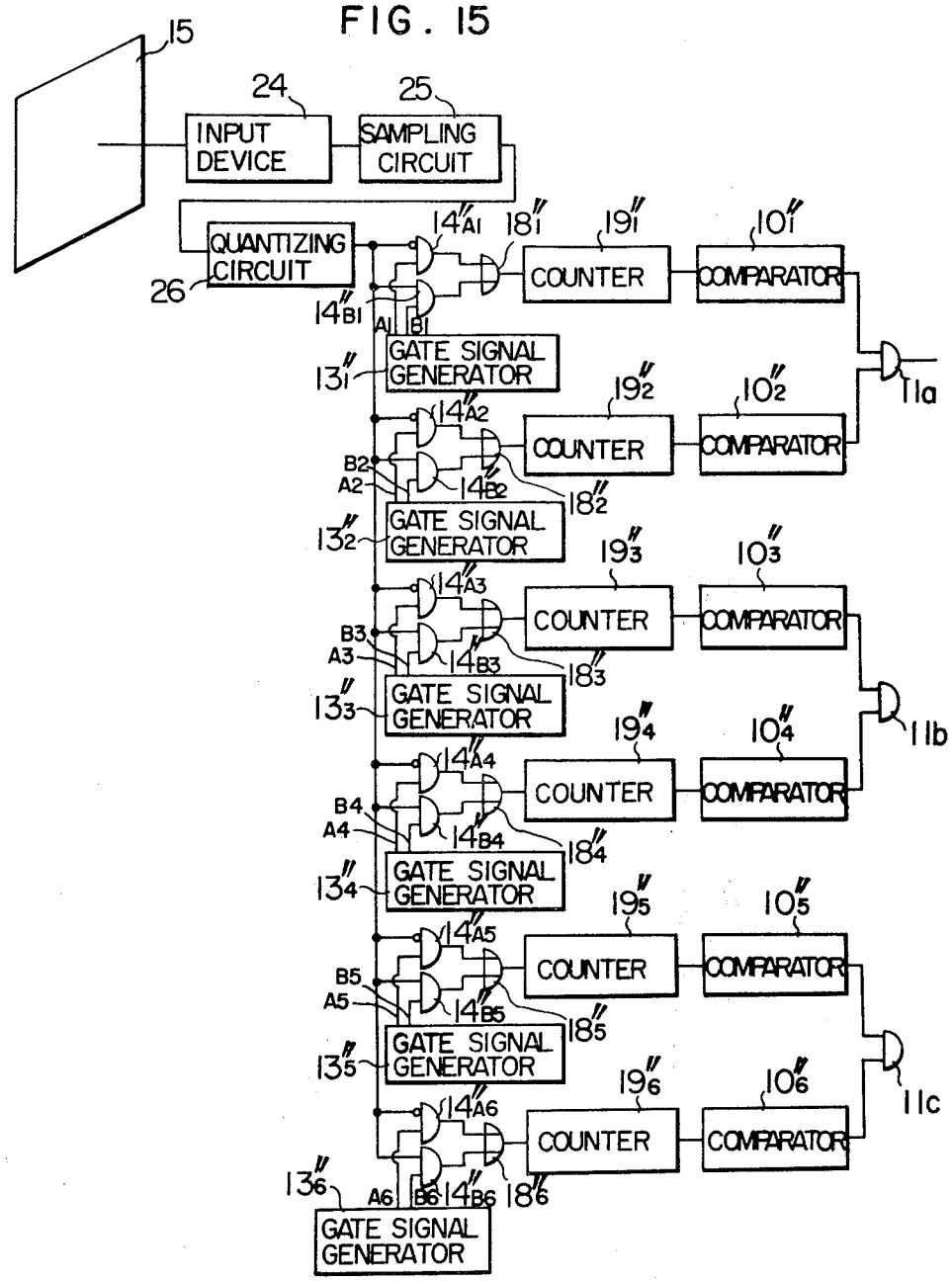

AUTOMATIC WORKING MACHINE

This invention relates to an automatic working machine having image information precessing means for recognizing the configuration and position of an object on the basis of image information obtained by scanning the object.

Prior art automatic working machines were not provided with effective means for recognizing or detecting the configuration and position of complex objects and could only handle a specific object placed at a predetermined position. Therefore, the prior art automatic working machines could not carry out required works on a plurality of kinds of objects having complex configurations. An attempt to deal with such a difficulty has been made by employing a plurality of contact detectors, for example, a plurality of electrical contacts closed in response to the impartation of pressure thereto. However, this method has had the practical disadvantages that these detectors must be brought into contact with the object, the provision of movable parts in the detectors results in a short service life, and the operating conditions initially set in these detectors cannot be easily changed.

Various attempts have further been made to recognize objects on the basis of image information obtained by scanning the objects. However, the apparatus suitable for this purpose has been invariably complex in structure and generally very expensive due to the fact that the apparatus must handle a huge amount of pattern information and perform complex processing.

The present invention contemplates the provision of an automatic working machine having object recognizing means of simple structure which can recognize an object by processing image information obtained by scanning the object. The automatic working machine of the present invention can recognize the configuration and position of an object of complex configuration without any contact therewith and can carry out various required works on the object according to the result of recognition.

It is a primary object of the present invention to provide an automatic working machine in which the area of an object is measured on the basis of an image signal so as to simply recognize the object and a working unit carries out the desired work on the object on the basis of the result of recognition.

Another object of the present invention is to provide an automatic working machine of the above character in which the working unit can carry out the desired work on a moving object while moving in the same direction as the direction of movement of the object.

Still another object of the present invention is to provide an automatic working machine of the above character in which a mechanical tactile senser is used to more accurately detect the position of an object detected by an image signal so that the working unit can be more accurately positioned relative to the object.

Yet another object of the present invention is to provide an automatic working machine of the above character in which a detecting device such as a television image input device can be maintained always in a position spaced by a predetermined distance from an object so as to obtain an image signal free from deficiency.

In accordance with the present invention, there is provided an automatic working machine comprising first means for inputting an image of a moving object, second means for measuring an image area which lies within a specific portion of the image space and in which the value of the image signal is included within a specific range, third means for recognizing the object on the basis of the output of said second means, and fourth means for carrying out the desired work on the object depending on the result of recognition by said third means.

The operation of the object recognizing means in the present invention is such that, in response to the application of an image of an object, the object recognizing means measures an image area which lies within a specific portion of the image space and in which the value of the image signal lies within a specific range, and decides as to whether or not this image area is included within the specific range, so that the operation conforming with the result of recognition can be automatically carried out.

The elements required for the automatic working machine of the present invention include an image input device such as an industrial television image input device, comparators, integrators, adders and a manipulator all of which are easily available. Thus, the automatic working machine is inexpensive and can operate at a high speed.

For a better understanding of the present invention the preferred embodiments of the present invention will be described with reference to the accompanying drawings, in which:

FIG. 10 is a block diagram of another embodiment of the present invention;

FIGS. 11a to 12c are diagrams for explaining the operation of the embodiment of FIG. 10;

FIG. 13a is a diagram for explaining the operation of a part of the embodiment of FIG. 10;

FIG. 13b is a block diagram of the circuit for the operation of FIG. 13a;

FIGS. 14a to 14c are another embodiment of the present invention and the operations thereof;

FIG. 15 is a further embodiment of the present invention;

FIGS. 16a to 16c are diagrams for explaining the operation of the embodiment of FIG. 15;

Figures 19A, 19B, 19C:
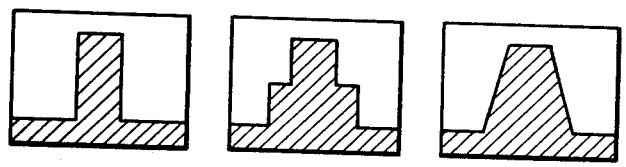
Figure 17A:
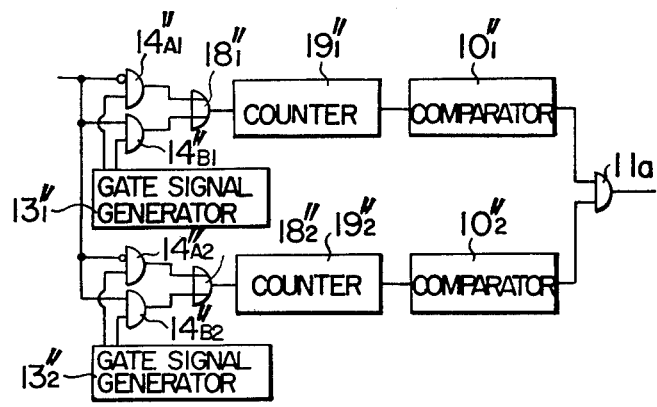
Figure 20:
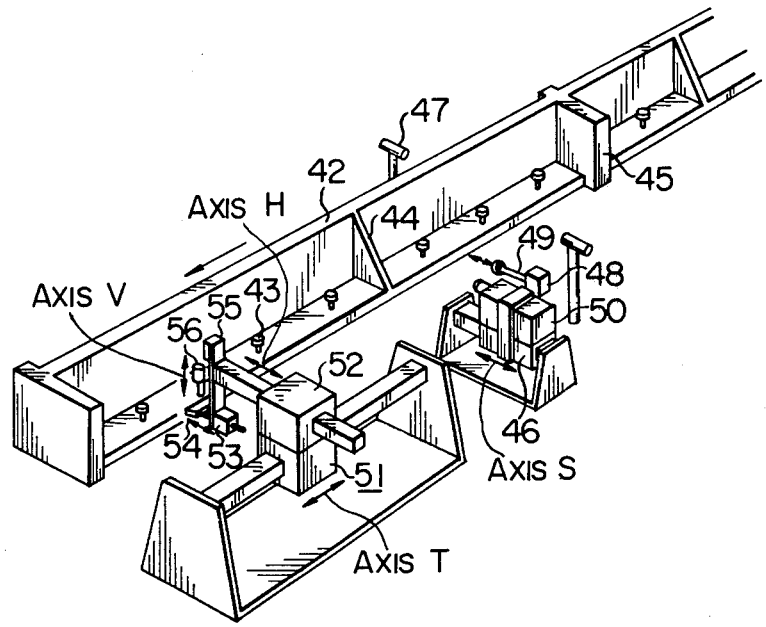
Figure 21:
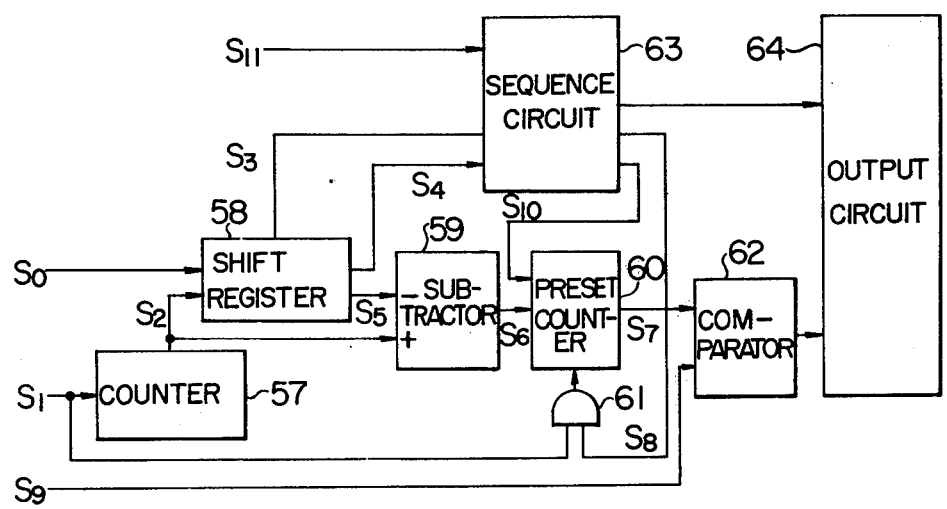
Figure 22:
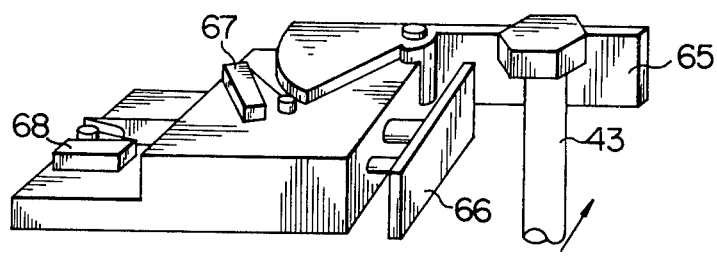
Figure 23:
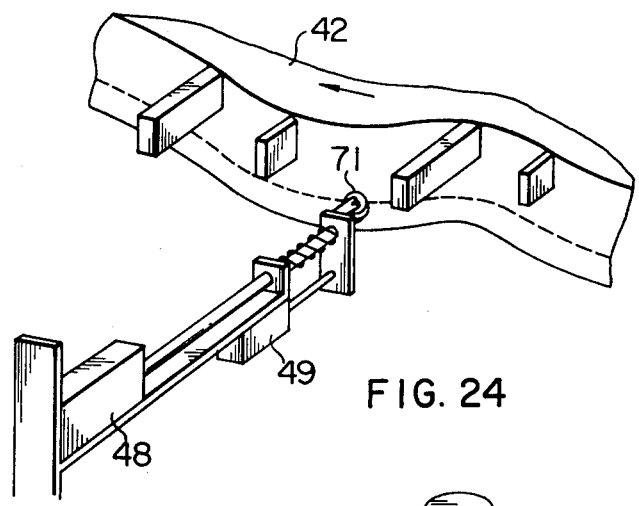
Figure 24:
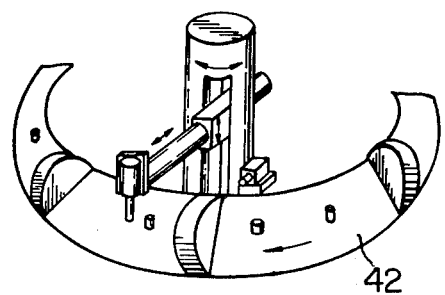

FIGS. 17a aand 17b are modifications of a part of the embodiment of FIG. 15;

FIG. 18 is a block diagram of an automatic working machine to which the present invention is applied;

FIGS. 19a to 19c are diagrams for explaining the operation of the machine of FIG. 18;

FIG. 20 is a schematic perspective view of an automatic bolt fastening-loosening machine to which the present invention is applied;

FIG. 21 is a block diagram of a control circuit used in the machine shown in FIG. 20;

FIG. 22 is a perspective view of a positioning means or feeler used in the machine shown in FIG. 20;

FIG. 23 shows a partial modification of the machine of FIG. 20 for handling a moving body; and FIG. 24 shows another partial modification for handling a rotating body.

Incidentally, for the sake of convenience to catch practical concepts terms for a general pattern will be contrasted below with terms for an image such as obtained by a television image input device:

| Terms for general pattern | Terms for image |
|---|---|
| Pattern | Image (information) |
| Pattern recognition | Recognition of image information |
| Pattern space | Image plane |
| Amount of (pattern) space | Area of image plane |
| Value of pattern | Value of image (Information concerning brightness or luminance) |

Figure 1:
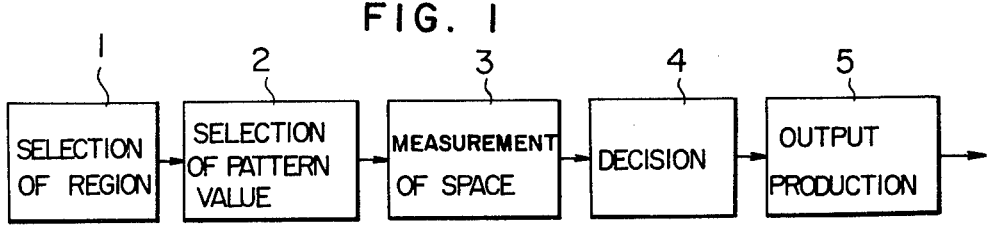
FIG. 1 is a schematic construction diagram of the pattern recognition apparatus according to the present invention.

The fundamental processing function of the apparatus of the present invention is shown in FIG. 1, in which reference numeral 1 designates a section to decide or select a specified region of a pattern space, reference numeral 2 designates a section to decide or select a specified range of the value of a pattern, reference numeral 3 designates a section to measure the amount of the space of the part of the pattern space which satisfies the decision conditions of sections 1 and 2, reference numeral 4 designates a section to decide whether the amount of space obtained by the section 3 is in a predetermined range or not, and reference numeral 5 designates a section to produce a final result of recognition by logically or arithmetically operating the result of the section 4.

Here, it is to be noted that FIG. 1 merely shows the fundamental processing function of the apparatus of the present invention and not the actual flow or transfer route of information. Thus, for example, the sections 1 and 2 may be exchanged, and a part or the whole of the section 5 may be transferred to the position before the section 3 to simplify the structure of the apparatus. Alternatively, it is common that the structure of the apparatus is complicated by arranging some functions in parallel.

Examples of the fundamental construction of the apparatus of FIG. 1 will next be described.

Figure 2:
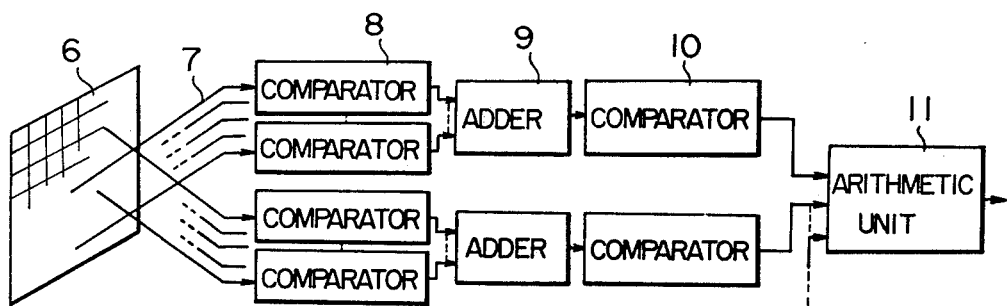
FIGS. 2 to 4 are block diagrams of embodiments of the apparatus of FIG. 1.

FIG. 2 is an example for a discrete pattern as an object, in which reference numeral 6 designates a memory board of an object pattern, reference numeral 7 designates pattern value reading wires, reference numeral 8 designates pattern value comparators, reference numeral 9 designates adders, reference numeral 10 designates comparators for the adders 9, and reference numeral 11 designates an arithmetic unit. The sequence of processing of this example is in agreement with that of FIG. 1. The read wires 7 realize the function of the section 1 in FIG. 1 by selecting the connection. The comparators 8 produce a binary signal "1" when the pattern value is within a specified range and correspond to the section 2 in FIG. 1. The adders 9 which add the outputs of the comparators 8 correspond to the section 3 in FIG. 1. The comparators 10 which produce a binary signal "1", for example, when the measured amount of space is within a specified range correspond to the section 4 in FIG. 1. The arithmetic unit 11 which operates on a number of state outputs of the comparators 10 to decide whether or not the object pattern is a specified pattern corresponds to the section 5 in FIG. 1.

Here, it is to be noted that the word "specified" can be rewritten as "set". Of course, this setting may be made at the time of selection of the apparatus, may be made temporarily by a variable element, or may be made by an additional circuit or device. Such a setting in some sense may be made by the part 7, 8, 10, or 11 such that conditions concerning the pattern to be recognized are given.

The arrangement of FIG. 2 has the recognizing function only for one kind of pattern. Consequently, to have the recognizing function for plural kinds of patterns either the conditions concerning the patterns to be recognized are successively varied or the circuit parts 7 to 11 are arranged in parallel in the same number as that of the kinds of the patterns. Of course some of these circuit parts may be used in common.

When the pattern values are to be treated discretely, additional elements such as analog-to-digital converters may be necessary. However, those elements which are not essential to the present invention are omitted. The same is true of the following examples, too.

Figure 3:
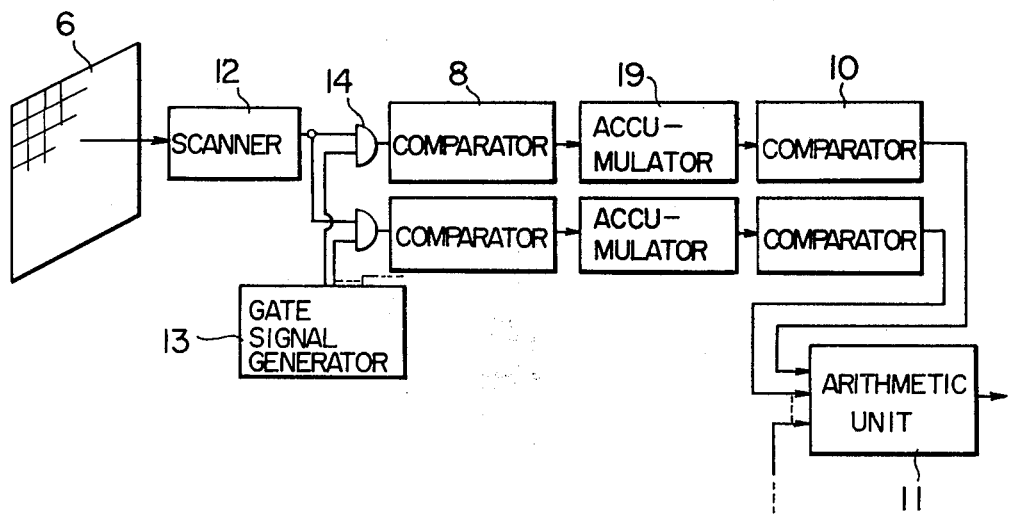

FIG. 3 shows an example of the arrangement capable of scanning the pattern space, in which reference numeral 12 designates a scanner to scan the pattern space 6 to pick up successively the pattern values at various parts of the pattern space 6, reference numeral 13 designates a pattern space gate signal generator to produce an output "1" while the scanner 12 is scanning the specified region of the pattern space 6, reference numeral 14 designates gate circuits to pass the output of the scanner 12 therethrough to the comparators 8 only when the output of the gate signal generator 13 is the binary signal "1", and reference numeral 19 designates accumulators to accumulate the number of the outputs "1" from the comparators 8. Since the value accumulated by the accumulator 19 does not generally have meaning until the scanning of the entire pattern space (hereinafter referred to as field scanning) is completed, it is necessary to establish such that the comparators 10 and the arithmetic unit 11 are operated at that time. The accumulator 19 has to have been reset at the start of the field scanning.

Figure 4:
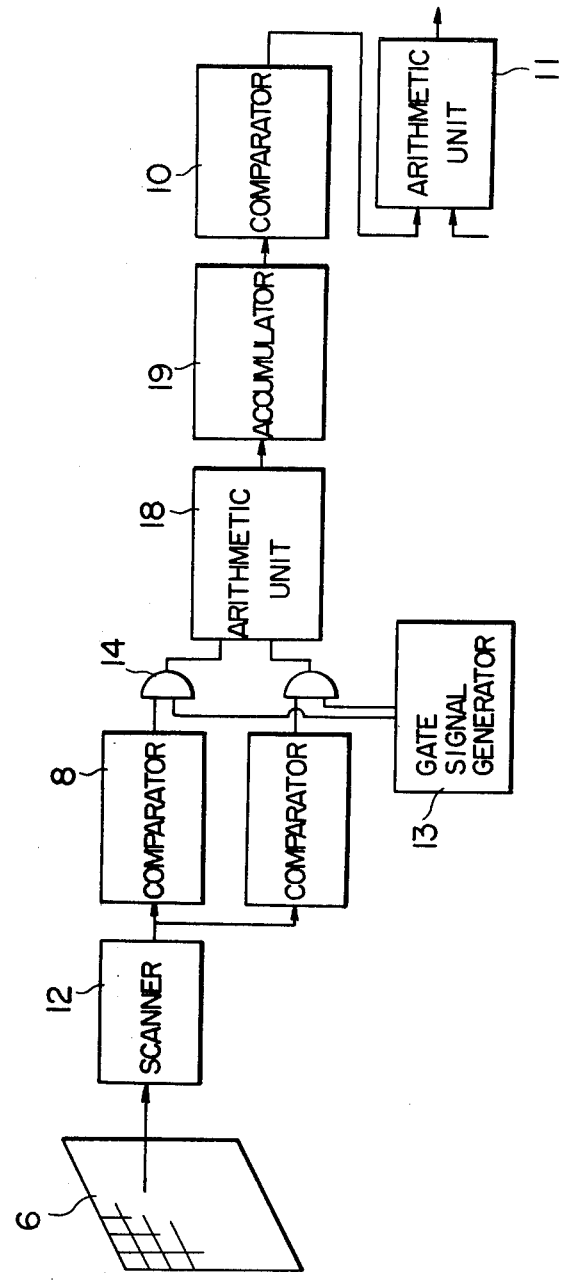

Even if the sequence of the gate circuits 14 and the comparators 8 is exchanged in the arrangement of FIG. 3, the same operation and result are provided. (An example is shown in FIG. 4.) The same is true of the sequence of the read wires 7 and the comparators 8 in the arrangement of FIG. 2, too.

FIG. 4 shows a similar arrangement to that of FIG. 3 except that the gate circuits 14 and the comparators 8 are exchanged and another arithmetic unit 18 is provided additionally before the accumulator 19. The operation of the arrangement of FIG. 4 is not so different from that of the arrangement of FIG. 3 that the description thereof is omitted.

Next, more practical embodiments of the present invention will be described in more detail.

Figure 5:
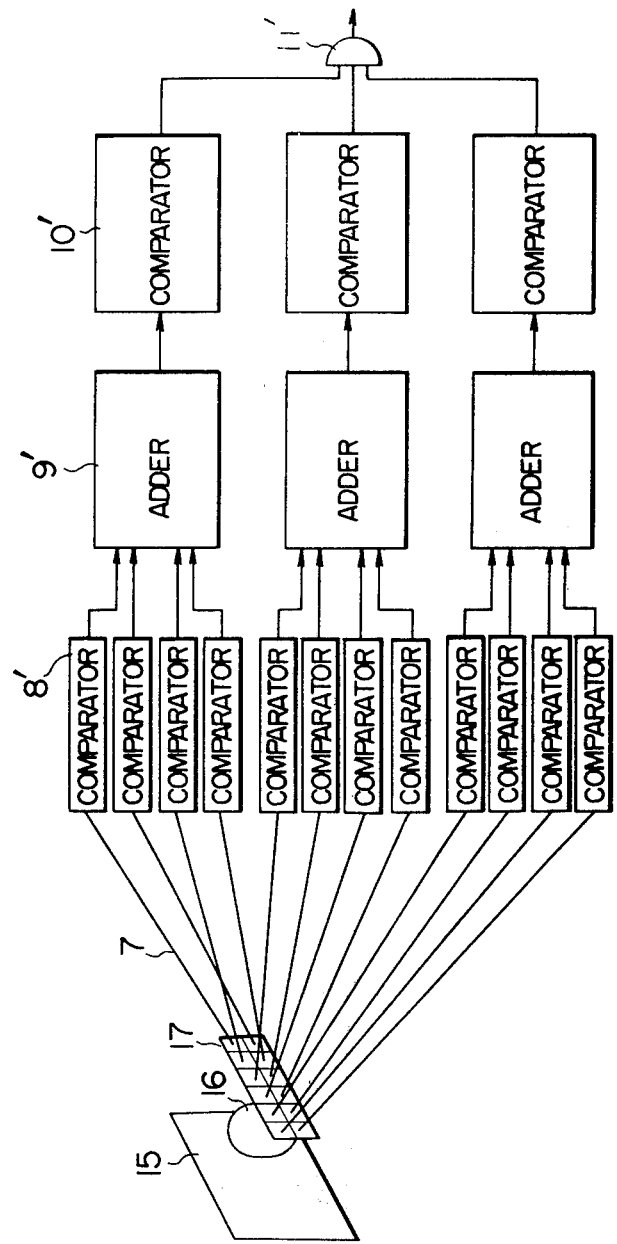
FIG. 5 is a block diagram of an embodiment of the present invention.
Figure 6:
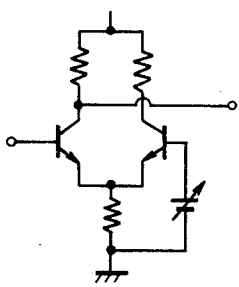
FIGS. 6 to 8 are practical circuit diagrams of various parts of the embodiment of FIG. 5.
Figure 7:
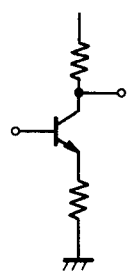

FIG. 5 shows an example of the construction of FIG. 2 having an object of recognition of a pattern of brightness of luminance (including a brightness or luminance pattern such as formed of a body. The same is true of the following embodiments, too). Reference numeral 15 designates an object pattern formed of brightness or luminance and reference numeral 16 designates an optical lens. Reference numeral 17 designates an array of photoelectric elements, for example a two-dimensional array of photo-diodes. The output part of the array of the photoelectric elements 17 may be regarded as one having the same effect as the pattern space or the memory board of the object pattern 6 in FIG. 2. Reference numeral 11' designates an AND circuit which corresponds to the arithmetic unit 11 in FIGS. 2 to 4. Reference numerals 8' and 10' designates analog comparators the circuit of which is as shown in FIG. 6. This analog comparator produces an output signal of either one of two states "1" and "0" for a continuous input signal. The threshold value thereof is determined by a variable power source. To invert the state of the output signal the use of an ordinary amplifier as shown in FIG. 7 is sufficient. For example, such a comparator as produces an output of binary "1" when the input signal is between certain upper and lower limits and produces an output of binary "0" when the input signal is outside that range can be made easily by combining such a circuit as shown in FIG. 7 and a logical element.

Figure 8:
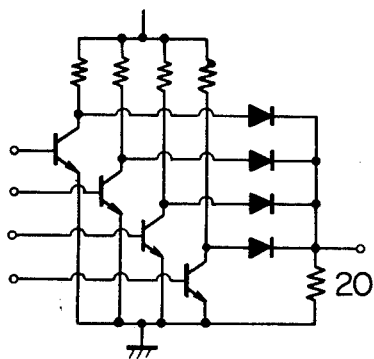

Reference numeral 9' designates an adder circuit which receives the output signals for four comparators 8' to produce an electric quantity proportional to the number of the input signals having the state "1". The actual structure of the adder circuit 9' is as shown in FIG. 8 in which among four transistors ones provided with a high input voltage become conducting to produce a voltage proportional to the number of the conducting transistors across a resistor 20 as an output voltage. The comparator 10' compares this output voltage with a set voltage and produces an output of a binary "1" if the output voltage is within the set range.

In this manner the sections 6, 7, 8, 9, 10, and 11 in FIG. 2 can be practised as the parts 17, 7, 8', 9', 10', and 11' in FIG. 5.

Figure 9:
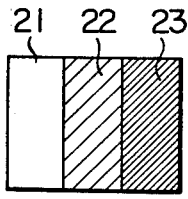
FIG. 9 is a diagram for explaining the operation of the embodiment of FIG. 5.

The operation of the arrangement of FIG. 5 will now be described. Consider the case that when the object to be recognized 15 is a brightness pattern as shown in FIG. 9, the output of the AND circuit 11' is a binary "1" and otherwise a binary "0". In FIG. 9 a darker part is more densely hatched. If it is assumed that the output of the photoelectric converter 17 is 0.9 – 1.0 V for the part 21 of the object pattern 15 shown in FIG. 9, 0.5 – 0.6 V for the part 22, and 0.0 – 0.1 V for the part 23, the analog comparators 8' are set such that the part (upper four) thereof corresponding to the area 21 outputs a binary "1" (high voltage) for the input 0.9 – 1.0 V, the part (central four) corresponding to the area 22 outputs a binary "1" for the input 0.5 – 0.6 V, the part (lower four) corresponding to the area 23 outputs a binary "1" for the input 0.0 – 0.1 V, and the analog comparators 8' output a binary "0" (0 V) for other input voltages.

Each of the adder circuits 9' is constructed such that when n of the four analog comparators 8' connected thereto produce a binary "1", it produces n/4 V. If each of the analog comparators 10' is set such that it produces a binary "1" when the output of the circuit 9' is 0.6 V or more, for example, it produces a binary "1" when at least three of the four analog comparators 8' produce a binary "1". If it is desired that the comparator 10' produces a "1" when all of the four comparators 8' produce a "1", it is sufficient to establish such that the comparator 10' produces a "1" when the output of the adder circuit 9' is 0.9 V, for example.

Thus, the set voltage of the comparator 10' depends upon to what degree the variation in the brightness and the distortion of the connfiguration of the brightness pattern 15 are allowed. Consequently, the larger the allowability is, the system more immune to noise results. However, if the allowability is made too large, the comparator 10' produces a binary "1" even to a different brightness pattern thereby providing an erroneous result.

The same is true of the selection of the set voltage of the analog comparators 8'. Although, in the above example, the photoelectrically converted output for an ideal object is used as the set value as it is, the setting may be made taking the stain of the object, the variation in the illumination on the object, etc. into consideration.

The setting condition of the analog comparators 8' and that of the analog comparators 10' have interrelation to a certain degree, for example, if the setting condition of the comparators 8' is stringent, it is better to loosen that of the comparators 10', while if the setting condition of the comparators 8' is loose, it is better to make the setting condition of the comparators 10' stringent.

If the setting of the comparators 8' and 10' is made in the above manner and if the object 15 has the pattern as shown in FIG. 9, the outputs of the three analog comparators 10' are all a binary "1" and the output of the AND circuit 11' is also a binary "1". When a pattern different from that in FIG. 9 in the degree of the brightness and in the configuration is selected as the object 15, the degree of the brightness does not meet the condition for the comparators 8', the difference in the configuration does not meet the condition for the setting elements 7 of a specified region of the pattern space, and, as a result, the condition for the comparators 10' is not satisfied, resulting in the output "0" of the AND circuit 11'. Thus, it can be said that the output of the AND circuit 11' is the recognized output for the pattern of FIG. 9.

If it is necessary to recognize patterns other than that of FIG. 9, all that has to be done is to provide the circuits corresponding to the circuit parts 7, 8', 9', 10', and 11' in the number of the patterns wished to recognize.

Of course it is needless to say that the read wires 7 are to be arranged in conformity with the configuration of each pattern, the analog comparators 8' are to be set in conformity with the degree of the brightness, and the analog comparators 10' are to be set in conformity with the variation in the configuration and the degree of the brightness.

FIG. 10 shows an example of the construction of FIG. 4. This example also has a brightness pattern as the object to be recognized similarly to the example of FIG. 5. Reference numeral 15 designates an object pattern composed of brightness, reference numeral 24 designates a television image input device, and reference numeral 25 designates a circuit for sampling an electric signal supplied continuously in time from the input device 24. By this sampling the image is made discrete in the horizontal direction. Reference numeral 26 designates an analog-to-digital converter for making the value of the continuous image signal held temporarily by the sampling circuit 25.

Reference numeral 8" designates digital comparators to produce an output of a binary "1" when the value of the image signal is within the set range. Reference numeral 14" designates AND gates which are gated by the space gate signal A or B supplied from a space gate signal generator 13".

Reference numeral 18″ designates an OR gate which supplies the outputs of the two gate circuits 14″. (When it is necessary to distinguish one from the other, the name of the space gate signal A or B is suffixed to them. The same is true of the following description, too.) The output of the OR gate 18″ is applied to a counter 19″ which counts the number of the pulses supplied from the OR gate 18″. Reference numeral 10″ designates a digital comparator which produces an output of a binary "1" when the count of the digital counter 19″ is within the set range.

A detailed structure and the operation of this circuit will next be described.

Figures 11A, 11B, 11C:
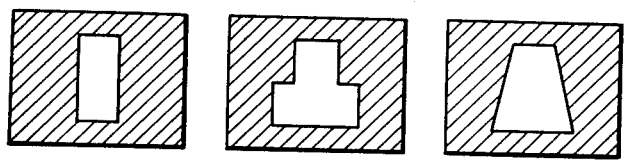

It is assumed that the object pattern is the three brightness patterns shown in FIGS. 11a to 11c, in which the hatched portions are black and the remaining portions are white. All that has to be done to discriminate (recognize) these patterns is to utilize the space gate signals shown in FIGS. 12a to 12c, respectively, for example, in which the part denoted by the letter A is that part in which the space gate signal A is a binary "1" and the remaining part is that part in which the space gate signal A is a binary "0". While scanning the object pattern, the state corresponding to the scanning point is outputted as a space gate signal.

The space gate signal and the circuit for generating it will be described referring to FIGS. 13a and 13b. FIG. 13a is a state diagram of the same space gate signal as that of FIG. 12a. It is assumed that when the state of a point in the object pattern is being inputted or scanned by, for example, the television image input device 24 in FIG. 10, the space gate signal at that time takes the state of the point at the same position on the space gate signal diagram, for example that of FIG. 13a. For example, if the scanning point is in the space region denoted by A in FIG. 13a, the space gate signal generator 13″ produces a binary "1" at its output terminal A, while if the scanning point is in the space region other than that denoted by A, a binary "0" is produced at the output terminal A. This signal is a one called a space gate signal A.

To produce the space gate signals A and B it is sufficient to employ the circuit shown in FIG. 13b, for example, in which reference numerals 27 and 27′ designate counters for counting the pulses proportional to the velocities in the horizontal and vertical directions of the respective scanning points. It is sufficient for the counters 27 and 27′ to use the sampling pulse used for the sampling circuit 25 in FIG. 10 and the horizontal synchronizing signal for scanning, respectively. Though not clearly shown in FIG. 13b, the counter 27 is made to be reset every time the horizontal scanning starts, while the counter 27′ is made to be reset every time the vertical scanning starts.

Reference numerals 28 and 29 designate registers for registering set values, and reference numerals 30 and 31 designate comparator circuits producing an output of a binary "1" when the upper input value (coded digital value: the same is true of the following description, too) is lower than the lower input value.

If it is assumed that the horizontal scanning is made in a direction of O, C, D, and E in FIG. 13a, the registers 28 and 29 are set with the pulse numbers corresponding to the C and D points, respectively. Then, when the left-hand side of the point C is being scanned, the outputs of the comparators 30 and 31 are both a binary "0", while on the right-hand side of the C point the output of the comparator 30 is a binary "1" and on the right-hand side of the D point the output of the comparator 31 is a binary "1".

The functions of registers 28′ and 29′ and comparator circuits 30′ and 31′ are the same as those of the registers 28 and 29 and the comparator circuits 30 and 31, respectively. If it is assumed that the vertical scanning is made in a direction of O, F, G, and H in FIG. 13a, the registers 28′ and 29′ are set with the pulse numbers corresponding to the F and G points, respectively. Then, when the upper side of the F point is being scanned, the outputs of the comparator circuits 30′ and 31′ are both a binary "0", while on the lower side of the F point the output of the comparator 30′ is a binary "1" and on the lower side of the point G the output of the comparator 31′ is a binary "1".

Reference numerals 32 and 33 designate AND circuits (small circle on the input indicates negation). In the connection shown the AND gate 32 produces an output of a binary "1" when the scanning point is between the points C and D in a horizontal direction and between the points F and G in a vertical direction, while the AND gate 33 produces an output of a binary "1" when the scanning point is above the point G in a vertical direction and the output of the AND circuit 32 is a binary "0". Consequently, the AND gate 32 produces the space gate signal A and the AND gate 33 produces the space gate signal B.

Figures 12A, 12B, 12C:
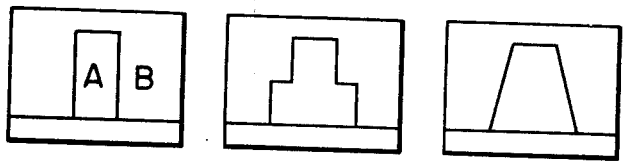

The space gate signal of FIG. 12b can be realized by somewhat complicating the above-described procedure. The space gate signal of FIG. 12c can be realized by gradually decreasing and increasing the contents of the registers 28 and 29, respectively, in FIG. 13b. It can be seen from the above description that a space gate signal generator can be easily realized.

It is assumed that when the arrangement of FIG. 10 scans the central white part of the pattern of FIG. 11a, the output of the analog-to-digital converter 26 is numerical values (that is, the lever of brightness) of from "10" to "15", for example, while when it scans the peripheral black part, the output of the converter 26 is numerical values of from "0" to "4". The output of the converter 26 is supplied to the two comparators 8″, one of which is denoted by $8''_A$ and the other of which is denoted by $8''_B$. The comparator $8''_A$ is made to produce an output of a binary "1" when it is supplied with an input of a numerical value of from "9" to "15", while the comparator $8''_B$ is made to produce an output of a binary "1" when it is supplied with an input of a numerical value of from "0" to "6". The output of the comparator $8''_A$ is connected to the gate circuit $14''_A$ which is open at the region A in FIG. 12a, while the output of the comparator $8''_B$ is connected to the gate circuit $14''_B$ which is open at the region B in FIG. 12a.

Then, when the pattern of FIG. 11a is the object pattern and the field scanning thereof is completed, the counter 19″, which counts the number of times the gate circuit 18″ outputs a binary "1", counts the numerical value corresponding to the area of the sum of the region A and the region B in FIG. 12a. When the pattern of FIG. 11b or 11c is selected as the object pattern, the count thereof is to be less than the above count.

If the comparator 10″ is constructed such that it produces an output of a binary "1" when it is supplied with an input of a numerical value approximating the numerical value corresponding to the area of the sum of the regions A and B in FIG. 12a, its output represents the result of the recognition of the pattern of FIG. 11a.

If the setting condition is made contrary to the above one, that is, if the comparator $8''_A$ is made to produce an output of a binary "1" when it is supplied with an input of a numerical value of from "0" to "6", while the comparator $8''_B$ is made to produce an output of a binary "1" when it is supplied with an input of a numerical value of from "9" to "15", the count of the counter 19'' is 0 when the object is the pattern of FIG. 11a and is a larger value when the object is a pattern other than that of FIG. 11a. Consequently, if the comparator 10'' is constructed such that it produces an output of a binary "1" when it is supplied with the count approximating 0, its output also represents the result of the recognition of the pattern of FIG. 11a.

Either of these two methods will do.

If it is desired to discriminate or recognize which of the patterns of FIGS. 11a and 11c the object pattern is by one scanning of the object pattern, it is sufficient to provide three sets of the digital comparators 8'' and the subsequent stages of circuits and to give suitable conditions to the comparators 8'' and 10'' and the gate signal generator 13'' of each set. Alternatively, it may be that maintaining the circuit of FIG. 10 as it is, the space gate signals are successively changed so that they correspond to the patterns of FIGS. 11a to 11c, for example like those of FIGS. 12a to 12c, respectively, at each entire scanning of each pattern, and at the same time also the setting conditions of the comparators 8'' and 10'' are likewise changed.

Incidentally, a method of recognizing the existance and position of an arbitrarily specified configuration contained in the pattern by utilizing this system will be described. In actual pattern recognition an object pattern can in some cases be positionally in complete agreement with the set condition or pattern (in some cases called a standard pattern), but often this cannot be done. Then, by shifting the entire object pattern or the set position concerning the pattern space the specified configuration, i.e. the specified part of the pattern can be recognized even for the pattern which is positionally not in agreement. In this case, if the displacement of the entire pattern or the set position has been made known, also the position of the specified part of the pattern can be recognized.

For example, in the example of FIG. 5 which can always provide a recognized output, if a recognized output can be provided while displacing the entire pattern or the optical field of the arrangement, the position of the part concerned of the object pattern can be known from the position of the optical axis at that time.

The example of FIG. 10 is a form which provides an output each time the scanning of the entire pattern space is completed, so that some consideration is necessary for the shifting method or so. To attain this purpose by changing the setting condition it is sufficient to gradually increase or decrease the contents of the registers 28, 29, 28', and 29' in FIG. 13b at each entire scanning or to gradually increase or decrease at each entire scanning the contents of the counters 27 and 27' (not restricting to make zero) at the time of resetting them. These methods merely perform translation. If rotation is necessary, all that is to be done is to perform the above-described gradual increase or decrease at each horizontal scanning and not at each entire scanning. In some cases the combination of these shifting methods provides a better result.

In FIGS. 12a to 12c the specified region of the pattern space is indicated by the regions A and B. However, the specified region is not necessary of two kinds. A number of regions of one kind can be scattered discretely. Also, there can be any part which belongs to no specified region of the pattern space as shown in FIGS. 12a to 12c, or contrary thereto all parts of the pattern space can belong to any specified region. This situation will be described below citing examples.

First, an example of a specified region of one kind is shown in FIG. 14a. This is on the supposition that the object pattern is limited to the three kinds of patterns of FIGS. 11a to 11c. The amount of space belonging to both region A and black of each object pattern is 100% of the amount of space of the region A of FIG. 11a, 0% of that of FIG. 11b, and 25% of that of FIG. 11c. Consequently, the three kinds of patterns can be discriminated by the circuit as shown in FIG. 14b. That is, if it has been made such that when the space gate signal generator 13'' is constructed to generate the space gate signal of FIG. 14a and when the values of the amount of space measured by the counter 19'' are about 100%, 0%, and 25%, respectively, of the amount of space of the region A, the output of each of digital comparators $10''_a$, $10''_b$ and $10''_c$ is a binary "1", they can be treated as the recognized output of the patterns of FIGS. 11a to 11c, respectively.

The case in which there are three kinds of specified regions is omitted because it has already been described referring to FIGS. 5 and 9.

An example of a number of discrete independent regions of one kind is shown in FIG. 14c. Even if such specified regions of space are used, a similar result can be obtained by the circuit of FIG. 14b.

FIGS. 16a to 16c are examples of the space gate signal corresponding to FIGS. 11a to 11c. If these space gate signals are utilized, the white part and the background black part of the object patterns of FIGS. 11a to 11c become the object of recognition processing. Consequently, a result of a higher likelihood is obtained then utilizing the space gate signal of FIG. 14a or 14c. Moreover, according to this method generation of the space gate signal is easy, and also by increasing the number of the space gate signals the recognition of a more complicated configuration is possible.

This method will next be described in some detail. It is assumed that in FIGS. 16a to 16c the part 101 is the space region $A_1$, the parts 100 and 102 are the regions $B_1$, the part 104 is the region $A_2$, the parts 103 and 105 are the regions $B_2$, the part 107 is the region $A_3$, the parts 106 and 108 are the regions $B_3$, the part 110 is the region $A_4$, the parts 109 and 111 are the regions $B_4$, the part 113 is the region $A_5$, the parts 112 and 114 are the regions $B_5$, the part 116 is the region $A_6$, and the parts 115 and 117 are the regions $B_6$. Also it is assumed that when the space gate signal generator is employed (FIGS. 4, 10, and 14b) the space gate signal generated by it is designated by the same notation as the above region. The dotted lines in FIGS. 16a to 16c indicate the profiles of the patterns of FIGS. 11a to 11c, respectively.

FIG. 15 is an embodiment of the arrangement according to the present invention for discriminating the patterns of FIGS. 11a to 11c by the setting of FIGS. 16a to 16c. Reference numeral 26' designates a quantizing circuit for putting the output of the sampling circuit 25, i.e. the pattern values of various parts of the object pattern 15 into either of the states "1" and "0". The signal from the hatched parts in FIGS. 11a to 11c is put into a binary "0", and the signal from the remaining parts is put into a binary "1". Reference numeral $13''_1$ designates a space gate signal generator for generating space gate signals $A_1$ and $B_1$, reference numeral $14''_{A1}$ designates an AND gate circuit to produce an output of a binary "1" when the signal $A_1$ of the space gate signal generator $13''_1$ is a binary "1" and the output of the quantizing circuit 26' is a binary "0", reference numeral $14''_{B1}$ designates an AND gate circuit which produces a binary "1" when the signal $B_1$ of the space gate signal generator $13''_1$ is a binary "1" and the output of the quantizing circuit 26' is a binary "1", and reference numerals $14''_{A2}$ and $14''_{B2}$ designate AND gate circuits performing the same operation as the AND circuits $14''_{A1}$ and $14''_{B1}$, respectively, except that the space gate signals are $A_2$ and $B_2$ signals. Reference numerals $18''_1$ and $18''_2$ designate OR gates.

Consequently, when the entire pattern space is scanned by the input device 24, number of pulses (spatially separated by the sampling circuit 25) proportional to the sum of the area of the part which is within the space region 100 or 102 and at which the state of the object pattern is "1" and the area which is within the space region 101 and at which the state of the object pattern is "0" are outputted by the OR gate circuit $18''_1$. Also, a number of pulses proportional to the sum of the area of the part which is within the space region 103 or 105 and at which the state of the object pattern is "1" and the area of the part which is within the space region 104 and at which the state of the object pattern is "0" are outputted by the OR gate circuit $18''_2$.

Reference numerals $19''_1$ and $19''_2$ designate counters for counting the numbers of pulses outputted by the OR gate circuits $18''_1$ and $18''_2$, respectively. Reference numerals $10''_1$ and $10''_2$ designate comparators which produce "1" when the contents or the counters $19''_1$ and $19''_2$ are lower than certain set values, otherwise produce "0", respectively. The comparators $10''_1$ and $10''_2$ are reset at the start of the scanning by the input device 24, and the counters $19''_1$ and $19''_2$ operate when the scanning by the input device 24 is performed over the entire pattern space.

Both of the space regions 101 and 104 in FIG. 16a are set to correspond to a part of the state "1" of the object pattern of FIG. 11a, and all of the space regions 100, 102, 103, and 105 are set to correspond to a part of the state "0" of the object pattern of FIG. 11a. Consequently, when the pattern of FIG. 11a is selected as the object pattern 15, the final counts of the counters $19''_1$ and $19''_2$ are both to be zero in principle, so that it is sufficient to select values approximating zero as the set values of the comparators $10''_1$ and $10''_2$. Actually, the count may not always be zero due to the deformation of the pattern. Consequently, a somewhat larger value may be selected as the set value to allow this situation. Then, when the pattern of FIG. 11a is selected as the object pattern 15, the output of both comparators $10''_1$ and $10''_2$ is a binary "1", so that the output of the AND gate circuit 11a is a binary "1".

When the pattern of FIG. 11b or 11c is selected as the object pattern 15, the output of the AND gate circuit 11a is a binary "0" because the counts of the counters $19''_1$ and $19''_2$ after the completion of respective field scanning are never values around zero simultaneously. That is, when set as above, the output of the gate circuit 11a can be regarded as the recognized signal of the pattern of FIG. 11a.

In FIG. 15, if the circuit blocks including the gate circuits 11b and 11c, respectively, are constructed similarly to the circuit block including the gate circuit 11a, the outputs of the gate circuits 11b and 11c are the recognized outputs of the patterns of FIGS. 11b and 11c, respectively. However, since the boundary between the regions 112 and 113 in FIG. 16c, for example, is not in complete agreement with the boundary line of the pattern of FIG. 11c, the final contents of the counters $19''_5$ and $19''_6$ are not zero but certain values even when the pattern of FIG. 11c is the object pattern. Since these values can be known beforehand from the pattern of FIG. 11c and the shape and size of the space regions of FIG. 16c, it is sufficient to make the comparators $10''_5$ and $10''_6$ such that they produce a binary "1" when the contents of the counters $19''_5$ and $19''_6$ approach these values, respectively.

The space regions 100, 101 and 102 in FIG. 16a happen to be the same as the space regions 106, 107 and 108 in FIG. 16b. In such a case, the circuit parts $13''_3$, $14''_{A3}$, $14''_{B3}$, $18''_3$ and $19''_3$ may be omitted and the output of the counter $19''_1$ may be supplied to the comparator $10''_3$. Further, if the comparison condition of the comparator $10''_1$ is in agreement with that of the comparator $10''_3$, the comparator $10''_3$ can of course be omitted so that the gate circuit 11b is supplied with the signal from the comparator $10''_1$ instead of from the comparator $10''_3$.

Figure 17B:
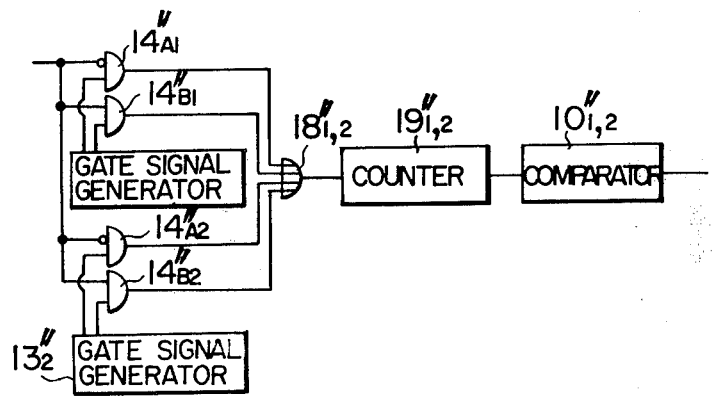

The circuit block including the gate circuit 11a in FIG. 15 which is again shown in FIG. 17a may be modified as shown in FIG. 17b. Strictly speaking, the operations of the circuits of FIGS. 17a and 17b are different from each other, but in some cases they attain the same purpose. In the arrangement of FIG. 17b, an OR gate $18''_{1, 2}$ supplies a number of pulses (described above) proportional to the sum of the area of the parts at which the state of the object pattern in the space regions 100, 102, 103 and 105 is "1" and the area of the parts at which the state of the object pattern in the space regions 101 and 104 is "1" to a counter $19''_{1, 2}$. The content of the counter $19''_{1, 2}$ at the time of the completion of the field scanning is decided by a comparator $10''_{1, 2}$. The setting value of the comparator $10''_{1, 2}$ should be determined taking the possibility of the deformation of the object pattern into consideration. If the deformation is considered to occur uniformly throughout the pattern, it is good to select the setting value of the comparator $10''_{1, 2}$ somewhat larger than the setting values of the comparators $10''_1$ and $10''_2$ taking the characteristics, property, etc. of the object pattern into consideration. Then, the arrangement of FIG. 17b has the advantage that the number of the circuit parts is smaller than that of the arrangement of FIG. 17a.

As regards the number of the circuit parts, the space gate signal generators $13''_1$, $13''_2$, . . . , $13''_6$ are not always necessary to be provided independently to individual circuit branches in FIG. 15, but in many cases the arrangement is simplified by replacing these space gate signal generators with a common space gate signal generator. Also, in the arrangement of FIG. 15 the recognition circuit blocks are provided individually for the three patterns, but it may be sufficient to provide only one circuit block which is to be used time sequentially by switching over the space gate signal and the setting value of the comparator, though the processing time is generally prolonged.

When the space gate signals of FIGS. 16a, 16b and 16c are utilized, recognition is possible even for some vertical positional variation of the object pattern. Consequently, provision of an effective industrial recognition apparatus is possible by making the most of these circumstances. When a body traveling carried by a belt conveyor is to be recognized as shown in FIG. 18 which will be described below, it is very advantageous to constructing apparatuses that some positional discrepancy in a direction lateral to the running direction is allowed. For example, when the space gate signal of FIG. 12b is used in place of that of FIG. 16b, a body or pattern shifted in a vertical direction cannot naturally be recognized. If such a body or pattern is to be recognized, the field of the television image input device or the entire space region is shifted in a vertical direction and field scanning must be repeated in a number of times. However, if the space gate signal of FIG. 16b is utilized, these cumbersome procedure for recognition processing is unnecessary. Consequently, not only the apparatus is simplified, but also the processing speed is improved.

In this manner, the apparatus of simple structure can decide as to whether the detected pattern coincides with an arbitrarily specified pattern or recognizes the existence and position of an arbitrarily specified configuration included in the detected pattern.

A pattern obtained by a converter such as a television image input device includes noise components frequently. According to this method, the pattern is not substantially adversely affected by such noise due to the fact that the amount of space is detected. Thus, this method can be very effectively practically used.

An apparatus of small scale can realize the desired pattern recognition since the method of processing is simple, and the pattern can be processed at a high speed. All of these factors reduce the cost of the apparatus, and a remarkable industrial advantage can be expected.

FIG. 18 shows an application of the arrangement of FIG. 10 to article selection or sorting. Articles travel in a horizontal direction and the selecting or recognizing operation is performed continuously. Illumination augments the brightness contrast between the articles and the background to enable the processing by two state signals.

In FIG. 18 reference numerals 34, 35, and 36 designate articles, reference numeral 37 designates a belt conveyor carrying the articles, reference numeral 38 designates a relatively bright plate which is luminant or illuminated, and reference numeral 24 designates a television image input device. When the articles 34, 35 and 36 are present in front of the image input device 24, images as shown in FIGS. 19a, 19b and 19c are inputted, respectively. Reference numeral 25 designates a sampling circuit (already described with reference to FIG. 10), and reference numeral 39 designates a quantizing circuit which is assumed to encode the white state of the image as shown in FIGS. 19a to 19c into a binary "1" and the black state into a binary "0". Reference numeral 13'' designates a space gate signal generator for generating the space gate signal of FIG. 12a and is assumed to output from its A output a signal which is a binary "1" at the part A in FIG. 12a and from its B output a signal which is a binary "1" at the part B in FIG. 12a. Reference numerals 14''$_A$ and 14''$_B$ designates AND circuits (small circle at the input indicates negation), and reference numeral 18'' designates an OR circuit. Since the AND gate 14''$_A$ outputs a signal which is a binary "1" when it is the part A in FIG. 12a and the image is white, and the AND gate 14''$_B$ outputs a signal which is a binary "1" when it is the part B in FIG. 12a and the image is black, the output of the OR gate 18'' is never a binary "1" when the image of FIG. 19a is inputted. Consequently, even at the state the scanning of the entire image is completed, the count of the counter 19'' is zero in principle. In contrast, when an image other than that of FIG. 19a is inputted, the numerical value corresponding to the area of the part different from the image of FIG. 19a (strictly speaking, the part in FIG. 12a which is not A nor B is subtracted from this part) is counted by the counter 19''.

Actually, since it cannot be expected that the count of the counter 19'' is completely zero, even if the article 34 becomes an object, due to noise and the movement of the body, it is good to determine the reference standard of the comparator 10'' by taking into consideration the count obtained when a body which is least different from the body 34 in shape is an object.

Reference numeral 40'' designates a manipulator control section which controls a predetermined handling by the output of the comparator 10'', and reference numeral 41 designates the handling part thereof.

The arrangement of FIG. 18 is provided with three sets of the circuit parts 13'', 14''$_A$, 14''$_B$, 18'', 19'' and 10''. These three sets of circuit branches are set suitably for the images of FIGS. 19a to 19c and output the recognized outputs of the articles 34, 35 and 36, respectively.

In this arrangement, the recognized output of a body can be obtained at the field at the moment the body passes the part corresponding to the set space region. Consequently, by supplying this output signal to the manipulator control section 40'' the handling or manipulating part 41 can perform operations suitable for individual bodies. For example, if the recognition output for the body 34 is supplied, the manipulator 41 catches and carries the body 34 to a predetermined plate; if the recognition output for the body 35 is supplied, the manipulator 41 pushes the body 35 down from the conveyor belt 37, and so on. Alternatively, if the kind of a body is memorized when the recognition output is produced and if the manipulator control section 40'' is made such that it drives the manipulator 41 after a certain time, which is dependent on the speed of the conveyor, has elapsed from the time of the recognition output production, sorting and handling are possible at a place different from the recognizing position. Since such manipulator control section and manipulator are known, no further description will be made.

FIG. 20 shows an application of the visual information processing system above described to an automatic bolt tightening-loosening machine. A plurality of bolts 43 to be tightened or loosened are provided on one surface of a body 42 between a large obstacle 45 obstructing the bolt tightening or loosening operation and a small obstacle 44 obstructing similarly the bolt tightening or loosening operation. This body 42 is moved in a direction as shown by the arrow by being carried by a carrier. In the actual working conditions, a plurality of such bodies 42 of different kinds having different shapes and sizes move successively on the same working line at different working intervals and sequences, and the spacing between and sequence of the bolts 43 and obstacles 44, 45 are not uniform in the direction of the arrow. Further, the bodies 42 are not intermittently fed but continuously fed since the work must be carried out at a high speed.

In view of such working conditions, a manipulator 51 for tightening or loosening the bolts 43 must be moved in synchronism with the movement of the body 42 in the direction of the arrow during the bolt tightening or loosening operation and the working unit of the manipulator 51 must be retracted to avoid contact with the obstacles 44 and 45 when these obstacles 44 and 45 are moved to a position opposite thereto. Further, a detecting means which can detect the bolts 43 and obstacles 44, 45 without any contact therewith is required in order that the bolts and obstacles moving with the irregular interval and sequence can be immediately detected as they pass the position of the detecting means. In the machine shown in FIG. 20, the detecting means includes an industrial television camera 50 similar to that used as an input device in the object recognition apparatus described hereinbefore for detecting the bolts 43 and obstacles 44 and 45. Further, due to the fact that the bodies 42 successively fed in the direction of the arrow have different shapes and sizes, a side face detector 49 is provided so that the detecting means (industrial television camera 50) can be set always at a position spaced by a predetermined distance from the side face of the body 42 when such body 42 is moving past the detecting means. Further, a tactile senser 54 is mounted on the working unit of the manipulator 51 so that the working unit can be accurately positioned relative to anyone of the bolts 43 during tightening or loosening such bolt 43.

The operation of the machine will now be described in detail with reference to FIG. 20. When one of the bodies 42 is moved to the working range of the machine, a body detector 47 such as a phototube or microswitch is actuated to actuate an on-off cylinder 48 in turn so that the side face detector 49 is advanced a predetermined distance toward the side face of the body 42. Subsequently, a cylinder 46 mounting the television camera 50 and cylinder 48 thereon is actuated in a direction of an axis (hereinafter referred to as an axis S) until the side face detector 49 carried by the cylinder 48 is brought into contact with the side face of the body 42. As soon as the side face detector 49 detects the side face of the body 42, the advancing movement in the direction of the axis S is ceased to complete the positioning of the television camera 50 relative to the body 42, and the cylinder 48 is actuated to retract the side face detector 49. In this manner, the television camera 50 can be set at a position spaced by a predetermined distance from the side face of the body 42 irrespective of the shape and size of the body 42. The structure of the visual image processing system for detecting the bolts 43 and obstacles 44 and 45 is similar to that shown in FIG. 18. More precisely, three circuit blocks each including a space gate signal generator 13'', AND gate circuits $14''_A$ and $14''_B$, an OR gate circuit 18'', a counter 19'' and a comparator 10'' as shown in FIG. 18 are provided in the visual image processing system so that recognition outputs can be applied to a manipulator control section 40'' when the bolts 43 and obstacles 44 and 45 on the body 42 are detected. In response to the application of these signals, the manipulator control section 40'' converts same into position information, and these position information are stored in a memory together with information of the objects detected by the detecting means. The position information which vary with the movement of the body 42 are stored in the memory until fastening or loosening of the bolts 43 and retracting movement of the working unit away from the obstacles 44 and 45 are finished.

FIG. 21 shows the structure of the manipulator control section 40''. Referring to FIG. 21, a signal $S_o$ is produced each time one of the objects, that is, one of the bolts 43 and obstacles 44 and 45 is detected. This signal $S_o$ is applied to a first-in first-out shift register 58. A pulse signal $S_1$ is applied to a counter 57 from a pulse generator mounted on the carrier for the body 42. An output $S_2$ representing the contents of the counter 57 is applied to the shift register 58 to be written in the shift register 58 together with the kind of the object. When this specific object is moved into the movable range of the manipulator 51 after the operation on the preceding object has been completed, a sequence circuit 63 applies a shift instruction signal $S_3$ to the shift register 58 to shift the information to the register in the last stage. A signal $S_4$ representing the detected object is applied to the sequence circuit 63. When this specific object is the bolt 43, an output $S_6$ of a subtractor 59 representing the result of subtraction of the position information $S_5$ in the shift register 58 from the output $S_2$ of the counter 57 is written in a preset counter 60 in response to the application of a preset instruction signal $S_{10}$ from the sequence circuit 63 to the preset counter 60. In this case, the output $S_7$ of the preset counter 60 is representative of the distance between the detecting means (television camera 50) and the specific object (bolt 43). However, due to the fact that this value must vary with the movement of the specific object, a tracking instruction signal $S_8$ is applied from the sequence circuit 63 to a gate circuit 61 to open this gate circuit 61 so that the pulse output $S_1$ of the pulse generator can be applied to the preset counter 60. Thus, the output $S_7$ of the preset counter 60 represents always the position of the specific object (bolt 43) in spite of the fact that the object (bolt 43) is moving. A signal $S_9$ representing the physical position of the manipulator 51 measured from the position of the detecting means (television camera 50) is fed back for the servo control of the manipulator 51 so that the manipulator 51 can operate while following the movement of the object. A comparator 62 compares the position signal $S_7$ representing the physical position of the bolt 43 with the position signal $S_9$ representing the physical position of the manipulator 51, and the output of the comparator 62 is applied to an output circuit 64.

The manipulator 51 comprises an axis (hereinafter referred to as an axis T) extending in the same direction as the travelling direction of the body 42, another axis (hereinafter referred to as an axis H) extending in a horizontal direction in perpendicular relation to the travelling direction of the body 42, and another axis (hereinafter referred to as an axis V) extending in the vertical direction as the direction of vertical movement of a bolt tightening-loosening tool 56. In order to stop the bolt tightening-loosening tool 56 in any desired position in both the direction of the axis T and the direction of the axis H, position information thereof is obtained by means of a pulse generator or resolver in the servo mechanism. The tactile senser 54 is actuated by an on-off cylinder 53 in the direction of the axis H so that the bolt tightening-loosening tool 56 can be accurately positioned relative to the bolt 43. The tactile senser 54 has a structure as shown in FIG. 22. Referring to FIG. 22, two bolt engaging members 65 and 66 engage the bolt 43 at a low speed (relative speed), and two detectors 67 and 68 associated with these members 65 and 66 are actuated to accurately position the bolt tightening-loosening tool 56 relative to the bolt 43.

The operation of the manipulator 51 will now be described. Suppose that the manipulator 51 is initially situated at the center of the axis T as shown in FIG. 20. When one of the bolts 43 is moved into the movable range of the manipulator 51 along the axis T, the manipulator 51 is urged toward the bolt 43 at a high speed, to approach the bolt 43. Then, the manipulator 51 is moved along the axis T in synchronism with the movement of the body 42, and the on-off cylinder 53 is actuated to advance the tactile senser 54 toward the body 42. Then, a servo cylinder 52 is actuated to urge the cylinder 53 in the direction of the axis H until the engaging member 65 of the tactile senser 54 engages the bolt 43. The detector 68 for detecting the movement of the tactile senser 54 in the direction of the axis H is actuated to cease the movement of the manipulator 51 in both the direction of the axis T and the direction of the axis H. The movement of the manipulator 51 in the direction of the axis T can be ceased by closing the gate 61 by ceasing the application of the tracking instruction signal $S_8$ to the gate 61 in FIG. 21. Due to the fact that the body 42 is continuously moving, the detector 67 for detecting the movement of the tactile senser 54 in the direction of the axis T is subsequently actuated. (When the speed of the body 42 relative to the moving speed of the manipulator 51 in the direction of the axis T is too high, a signal obtained by frequency division of the pulse signal $S_1$ may be applied to the preset counter 60, while when this speed is too low, an up-down counter may be used as the counter 60 and may be operated to count down.)

Upon completion of accurate positioning of the manipulator 51 relative to the bolt 43, the manipulator 51 is moved again in the direction of the axis T in synchronism with the movement of the body 42. At the same time, the bolt tightening-loosening tool 56 is urged downward along the axis V by a cylinder 55 to tighten or loosen the bolt 43 and is urged upward again along the axis V after such operation. When it is required to retract the tactile senser 54 during the bolt tightening or loosening operation, the cylinder 53 may be actuated upon completion of the positioning of the manipulator 51, hence the tool 56, to cause retracting movement of the tactile senser 54. After this bolt tightening or loosening operation has been finished, the shift instruction signal $S_3$ is applied to the shift register 58 in FIG. 21 to read out the next information stored in the shift register 58. When this information represents the next bolt 43, the bolt tightening-loosening tool 56 is only slightly retracted along the axis H, while when such information represents the obstacle 44, the bolt tightening-loosening tool 56 is retracted by an amount greater than in the case of the bolt 43. On the other hand, when such information represents the obstacle 45, the tool 56 is retracted by an amount greater than in the case of the obstacle 44. In these latter cases, the manipulator 51 is moved along the axis T in synchronism with the movement of the body 42 so that the bolt tightening-loosening tool 56 may not engage the obstacle 44 or 45 during the retracting movement thereof. In this manner, the amount of retraction of the bolt fastening-loosening tool 56 is varied depending on the kind of the next object so that the work can be carried out at a high speed. When the next object is either the obstacle 44 or the obstacle 45, the shift instruction signal $S_3$ is applied to the shift register 58 again after the retraction of the bolt tightening-loosening tool 56 along the axis H so as to read out the next information stored in the shift register 58. The signal $S_4$ representing the kind of the object and a signal $S_{11}$ for the processing of each step are successively applied to the sequence circuit 63 in FIG. 21 so that a series of sequential operations as above described can be carried out. The structure of the sequence circuit 63 is similar to that of known means such as a ROM and any detailed description thereof will not be given herein.

It will thus be seen that moving bolts can be automatically tightened or loosened by the method above described. A part of the machine may be suitably modified or replaced by another mechanism depending on the kind of work or working condition so that the machine can automatically handle various objects.

In the machine described with reference to FIG. 20, the body 42 is arranged to move relative to the manipulator 51 which is movable over a limited range. However, the body 42 may be kept stationary and the manipulator 51 may be arranged to move over the entire length of the body 42. In such a case, the pulse generator mounted on the carrier for the body 42 is eliminated and such pulse generator may be mounted on the carrier for the manipulator 51.

In the embodiment described with reference to FIGS. 20 and 22, the feeder 54 comprises the two bolt engaging members 65 and 66 which engage the bolt in both the direction of the axis H and the direction of the axis T. However, one of these two bolt engaging members may be eliminated when only one bolt engaging member can accurately position the bolt tightening-loosening tool 56 relative to the bolt. The tactile senser 54 may be eliminated when the accurate positioning can be sufficiently attained by visual detection without requiring such tactile senser. Further, in the embodiment above described, the bolt tightening-loosening tool 56 is mounted on the manipulator 51 for the bolt tightening or loosening operation. However, any suitable working unit may be mounted on the manipulator 51 in place of the bolt tightening-loosening tool 56 when the required work is machining, article loading or the like.

FIG. 23 shows a partial modification of the machine shown in FIG. 20, and this modification is adapted to deal with the case in which the side face of the body 42 has a curved shape. Referring to FIG. 23, a roller 71 is mounted on the end of the side face detector 49, and the side face detector 49 is urged in the direction of the axis S so that the roller 71 can make continuous contact with the side face of the body 42 and the side face detector 49 can operate continuously. (When the side face detector 49 is a potentiometer, the cylinder 48 is actuated so as to maintain the potentiometer in the neutral position.) Thus, the television camera 50 can be always set in a position spaced by a predetermined distance from the side face of the body 42.

The above description has referred to the arrangement in which the body 42 moves along a straight path relative to the manipulator 51. The automatic working machine provided with the visual information processing system of the present invention is also applicable to an arrangement in which the body 42 makes rotating movement as shown in FIG. 24. In this case, the manipulator 51 comprises an axis along which the manipulator can rotate in the rotating direction of the body 42, another axis along which the manipulator can be advanced and retracted in the radial direction of the body 42, and another axis along which the manipulator can make vertical movement relative to the body 42. Thus, the working unit of the manipulator can follow the movement of the rotating body 42 while making advancing or retracting movement relative to the body 42.

The automatic working machine having the visual information processing function is thus very effective in reducing the number of working steps due to the fact that is can carry out various works on a variety of objects of complicated shape.

What we claim is:

1. An automatic working machine comprising:
    a television image input device for obtaining an optical image of a moving object to be worked and for converting the optical image into electrical signals;
    means for detecting the kind of object to be worked including means providing at least one predetermined range of level of electrical signals assumed for the shape of predetermined objects to be worked in an image plane of said television input device, means for measuring the area of the object to be worked in accordance with the electrical signals provided by said television input device obtaining an optical image of the moving object to be worked, and means for comparing the electrical signals of the measured area with the at least one predetermined range of electrical signals to detect the kind of object to be worked; and
    a working unit for effecting a predetermined work on the object to be worked in response to the result of detection of said detecting means.

2. An automatic working machine according to claim 1, wherein said means providing at least one predetermined range of level of electrical signals provides such range for a specified portion of the image plane out of said television input device and means for measuring the area of the object to be worked in accordance with the electrical signals provided by said television input device measures the area of the object to be worked when the electrical signals are above a predetermined level corresponding to the specified portion of the image plane.

3. An automatic working machine according to claim 1, wherein said working unit includes means for controlling said working unit to cause said working unit to follow the movement of the object to be worked.

4. An automatic working machine according to claim 3, further comprising a tactile sensor for accurately positioning a working portion of said working unit relative to the object to be worked.

5. An automatic working machine according to claim 1, further comprising means for always maintaining said television input device a predetermined distance from the object to be worked.

* * * * *